(12) United States Patent
Liu et al.

(10) Patent No.: US 11,557,021 B2
(45) Date of Patent: Jan. 17, 2023

(54) POSITIONING SYSTEM OF MOBILE DEVICE

(71) Applicant: Quanta Computer Inc., Taoyuan (TW)

(72) Inventors: Chao-Yi Liu, Taoyuan (TW); Chia-Wei Lin, Taoyuan (TW); Yang-Sheng Wang, Taoyuan (TW); Chun-Ting Chen, Taoyuan (TW); Yu-Ching Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 672 days.

(21) Appl. No.: 16/598,222

(22) Filed: Oct. 10, 2019

(65) Prior Publication Data
US 2020/0319342 A1    Oct. 8, 2020

(30) Foreign Application Priority Data
Apr. 2, 2019    (TW) .................................. 108111591

(51) Int. Cl.
*G06T 3/60*    (2006.01)
*G01S 7/48*    (2006.01)
*G01S 17/89*    (2020.01)

(52) U.S. Cl.
CPC .............. *G06T 3/60* (2013.01); *G01S 7/4808* (2013.01); *G01S 17/89* (2013.01)

(58) Field of Classification Search
CPC ......... G06T 3/60; G01S 7/4808; G01S 17/89; G01S 13/08; G01C 21/005
See application file for complete search history.

(56) References Cited

U.S. PATENT DOCUMENTS

| 10,436,595 B2 | 10/2019 | Wang et al. | |
| 2002/0061131 A1* | 5/2002 | Sawhney | G06T 15/205 |
| | | | 382/154 |
| 2015/0378015 A1* | 12/2015 | You | G01S 13/867 |
| | | | 701/469 |

(Continued)

FOREIGN PATENT DOCUMENTS

| CN | 105277190 A | | 1/2016 | |
| CN | 108256060 A | * | 7/2018 | ............. G01S 17/88 |

(Continued)

OTHER PUBLICATIONS

Chinese language office action dated Oct. 9, 2019, issued in application No. TW 108111591.

*Primary Examiner* — Ryan R Yang
(74) *Attorney, Agent, or Firm* — McClure, Qualey & Rodack, LLP

(57) ABSTRACT

A positioning system includes a storage device, a lidar and a controller. The storage device stores a global map. The lidar generates an initial local map. The controller rotates the initial local map to generate a rotated local map, compares the rotated local map and the initial local map separately with a plurality of partial areas of the global map, so as to obtain at least one similar area, calculates at least one candidate coordinates for a mobile device on the global map according to the center point of each of the similar areas, and calculates similarity scores according to each of the candidate coordinates, and selects the candidate coordinates having highest similarity score for use as coordinate of the mobile device on the global map.

10 Claims, 10 Drawing Sheets

(56) References Cited

U.S. PATENT DOCUMENTS

| | | | |
|---|---|---|---|
| 2018/0143647 A1* | 5/2018 | Wang | G05D 1/0274 |
| 2018/0196139 A1* | 7/2018 | Brown | G01S 17/10 |
| 2018/0216942 A1* | 8/2018 | Wang | G01S 17/89 |
| 2019/0065863 A1* | 2/2019 | Luo | G06V 10/757 |
| 2019/0383945 A1* | 12/2019 | Wang | G01S 17/42 |

FOREIGN PATENT DOCUMENTS

| | | | | |
|---|---|---|---|---|
| CN | 108387241 A | | 8/2018 | |
| JP | 2018084573 A | * | 5/2018 | ........... G05D 1/0088 |
| TW | 201830348 A | | 8/2018 | |

\* cited by examiner

POSITIONING SYSTEM OF MOBILE DEVICE

CROSS REFERENCE TO RELATED APPLICATIONS

This Application claims priority of Taiwan Patent Application No. 108111591, filed on Apr. 2, 2019, the entirety of which is incorporated by reference herein.

BACKGROUND OF THE INVENTION

Field of the Invention

The present disclosure relates to a positioning system and, in particular, to a positioning system for a mobile device.

Description of the Related Art

With the advancements in technology, more and more smart mobile devices are being used by users. These include sweeping robots, service robots, industrial robots, and the like. These smart mobile devices need to know their location on a known map (such as at the origin of a known map) in order to move smoothly.

In known maps, if a smart mobile device that uses laser signals for positioning start to move at a non-original point, the smart mobile device cannot know its location on the map. One solution is to use Adaptive Monte Carlo Localization (AMCL) algorithm to get the location on the map. However, Adaptive Monte Carlo Localization algorithm cannot let the low-power smart mobile devices in a large-area to obtain their location quickly and accurately, so the user cannot start and operate the smart mobile device from just any location.

Therefore, the existing methods described above still need further improvement.

BRIEF SUMMARY OF THE INVENTION

In accordance with one feature of the present invention, the present disclosure provides a positioning system. The positioning system is suitable for use with a mobile device. The positioning system comprises a storage device, a lidar and a controller. The storage device is configured to store a global map. The lidar is configured to generate an initial local map. The controller is configured to rotate the initial local map to generate a rotated local map, compare the rotated local map and the initial local map separately with a plurality of partial areas of the global map, so as to obtain at least one similar area, calculate at least one candidate coordinates of the mobile device located on the global map according to the center point of each of the similar areas, calculate similarity scores according to each of the candidate coordinates, and select the candidate coordinates having highest similarity score for use as a coordinate of the mobile device on the global map.

The positioning system of the present invention can randomly place the mobile device equipped with the positioning system of the present invention at any position of the known map. When the mobile device is activated at a non-origin or a specific position of the known map, the mobile device can use the laser light source to combine the map information for positioning through the positioning system to achieve fast and accurate positioning effect.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
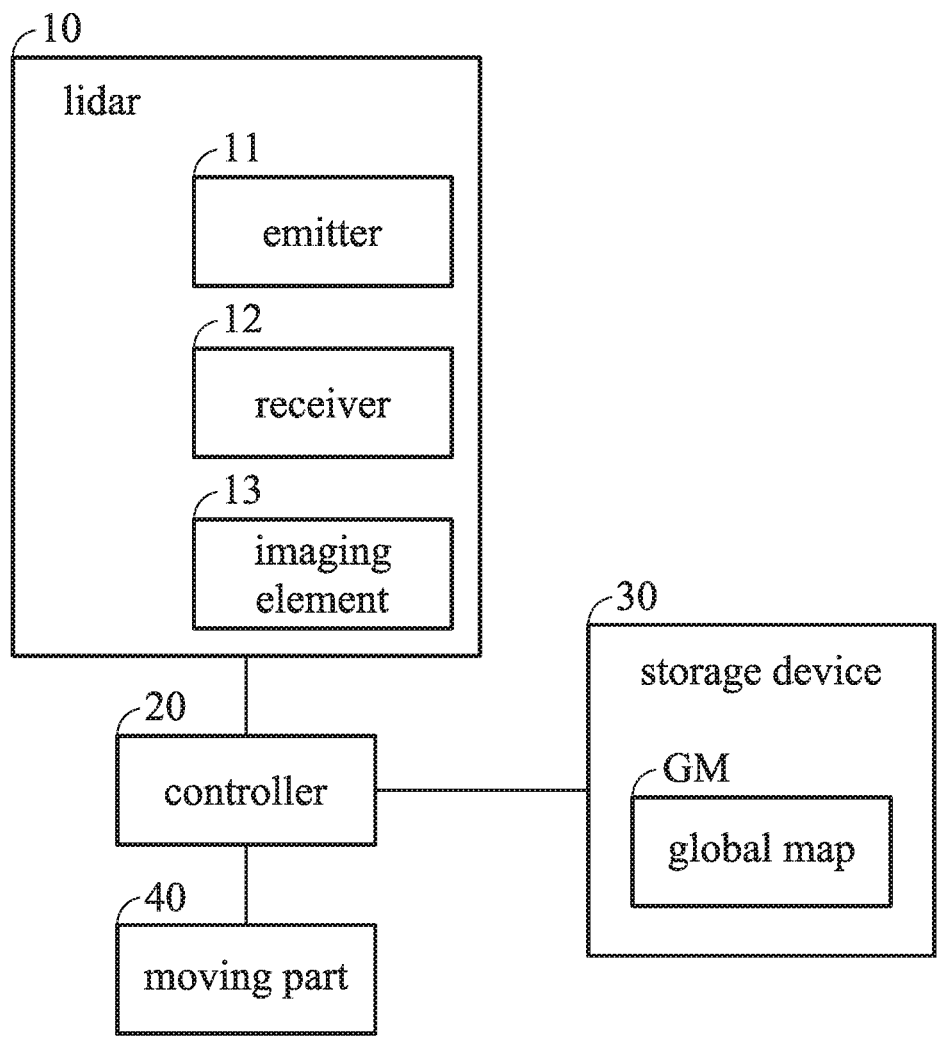
FIG. 1 is a block diagram of a positioning system 100 in accordance with one embodiment of the present disclosure.
Figure 2:
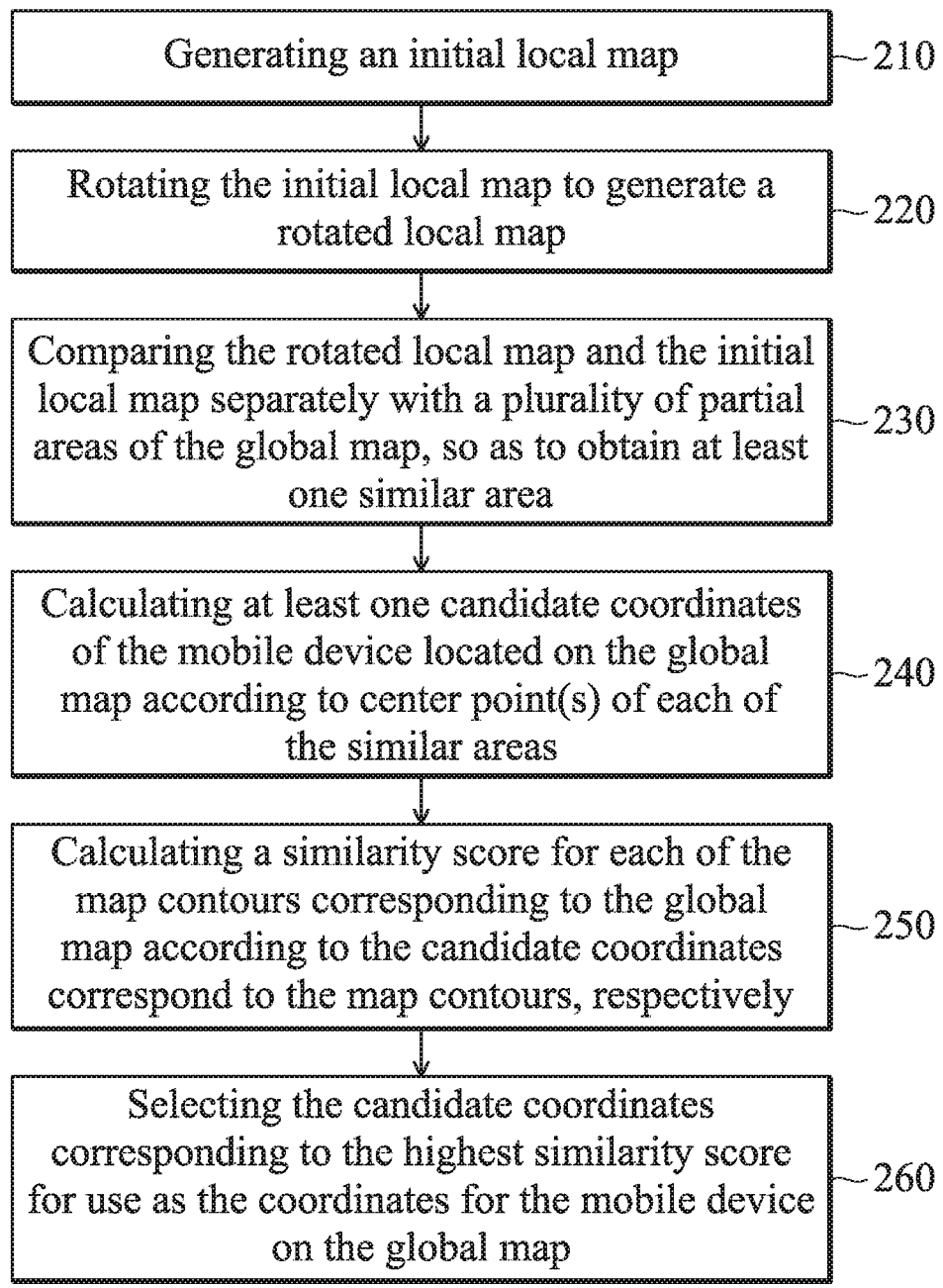
FIG. 2 is a flowchart of a positioning method of the data forwarding system in accordance with one embodiment of the present disclosure.
Figure 3A:
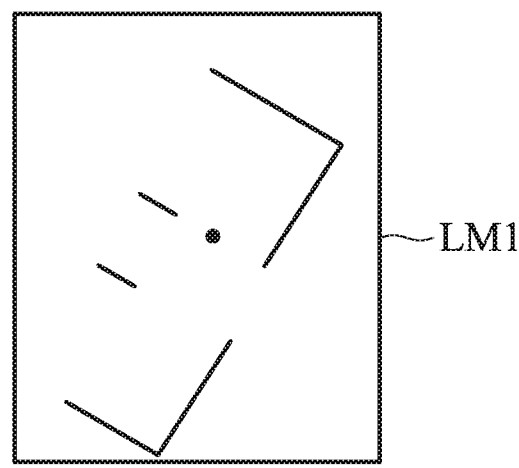
FIG. 3A is a schematic diagram of an initial local map in accordance with one embodiment of the present disclosure.
Figure 3B:
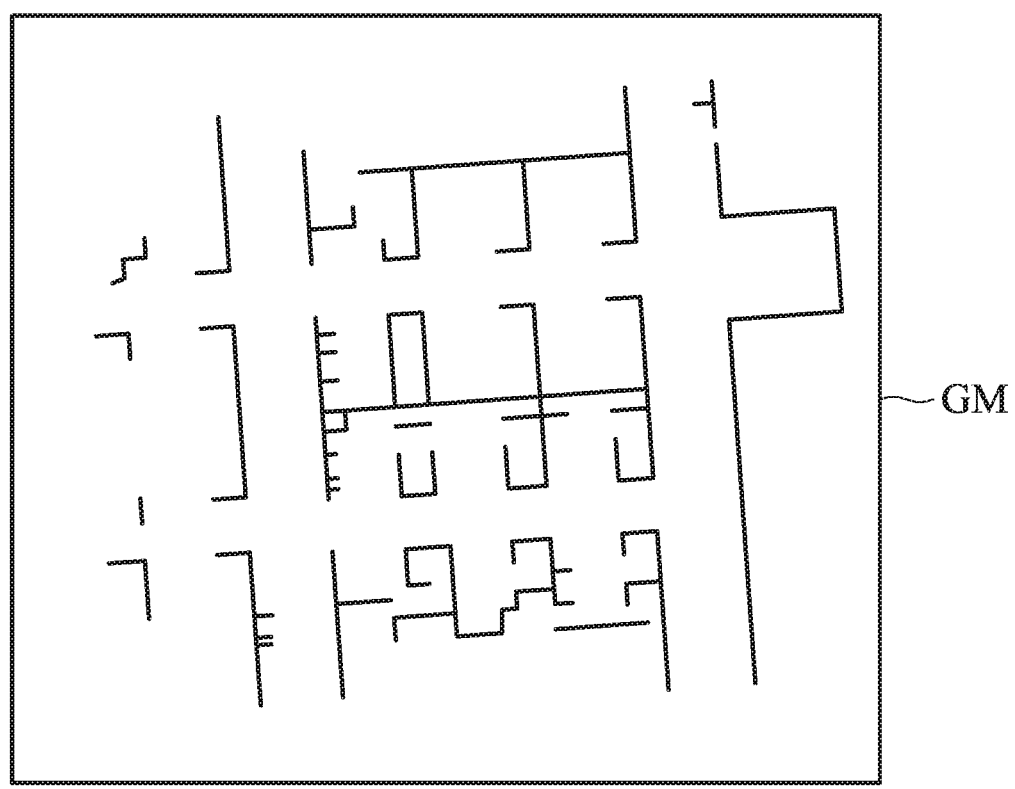
FIG. 3B is a schematic diagram of a global map in accordance with one embodiment of the present disclosure.

Please refer to FIGS. 1-2 and 3A-3B. FIG. 1 is a block diagram of a positioning system 100 in accordance with one embodiment of the present disclosure. FIG. 2 is a flowchart of a positioning method of the data forwarding system in accordance with one embodiment of the present disclosure. FIG. 3A is a schematic diagram of an initial local map LM1 in accordance with one embodiment of the present disclosure. FIG. 3B is a schematic diagram of a global map GM in accordance with one embodiment of the present disclosure.

As shown in FIG. 1, the positioning system 100 is suitable for use on a mobile device. For example, the positioning system 100 can be configured on a moving device, such as a cleaning robot, a service robot, an industrial robot, and the like. The positioning system 100 includes a lidar 10, a controller 20, and a storage device 30. In one embodiment, the positioning system 100 further includes a moving part 40, such as a wheel. In addition, the controller 20 can control the direction of movement and/or the speed of movement of the moving part 40.

In one embodiment, lidar 10 (Light Detection and Ranging device), also known as laser radar, uses light to measure the distance of a target. Lidar 10 can measure the distance with high precision, identify the contour of the object and establish the surrounding three-dimensional geographic information model. Lidar has the advantages of high-distance range measurement, high precision, high discrimination. In addition, lidar 10 would not be affected by the ambient brightness. Lidar 10 can sense the obstacles, distances and other information around the day and night. The scanning range of lidar 10 can be several meters to several hundred meters, that meet more accurate sensing needs.

In one embodiment, lidar 10 includes emitter 11, receiver 12 and/or imaging component 13.

In one embodiment, the emitter 11 emits a plurality of laser light sources.

In one embodiment, the receiver 12 receives a reflected light source after the laser light source hits an obstacle or an object. In one embodiment, the receiver 12 can be a light sensor. In one embodiment, the light sensor generally uses a photodiode (PD) or avalanche photodiode (APD).

In one embodiment, the imaging element 13 calculates the obstacle distance between the lidar 10 and the obstacle according to the time difference between the laser light source emitted by the emitter 11 and the reflected light source received by the receiver 12. The imaging element 13 calculates to draw the initial local map (for example, the initial local map LM1 shown in FIG. 3A) according to the obstacle distance and transmits the initial local map LM1 to the controller 20. In one embodiment, the imaging element 13 may be a scanning or non-scanning imaging element. In a specific embodiment, the controller 20 can draw the initial local map LM1 based on the information obtained by the lidar 10.

In one embodiment, the controller 20 can be any electronic device having a calculation function. The controller 20 can be implemented using an integrated circuit, such as a microcontroller, a microprocessor, a digital signal processor, an application specific integrated circuit (ASIC), or a logic circuit.

In one embodiment, the storage device 30 can be implemented as a read-only memory, a flash memory, a floppy disk, a hard disk, a compact disk, a flash drive, a tape, a network accessible database, or as a storage medium that can be easily considered by those skilled in the art to have the same function. In one embodiment, the storage device 30 pre-stores a global map (for example, the global map GM shown in FIG. 3B).

The positioning method 200 will be described below. The positioning method 200 is used to obtain mobile device's location or coordinate of the global map GM. In detail, the global map GM is stored in the storage device 30 as known information. The initial local map LM1 is generated immediately. The positioning method 200 is to position of the initial local map LM1 relative to the global map GM to obtain the coordinate that the mobile device is located on the global map GM.

In step 210, the lidar 10 is used to generate an initial local map LM1.

As shown in FIG. 3A, in order to generate a complete point cloud, the lidar 10 must be able to obtain the sample for the current environment very quickly. In some embodiments, the lidar 10 uses a rotating assembly or rotating mirror to let the emitter 11 to scan the current environment for the range from 0~360 degrees. In another embodiment, a plurality of lidars 10 can be installed in the positioning system 100 to increase the scanning range and efficiency. Therefore, the initial local map LM1 can be generated by the lidars 10.

Figure 4A:
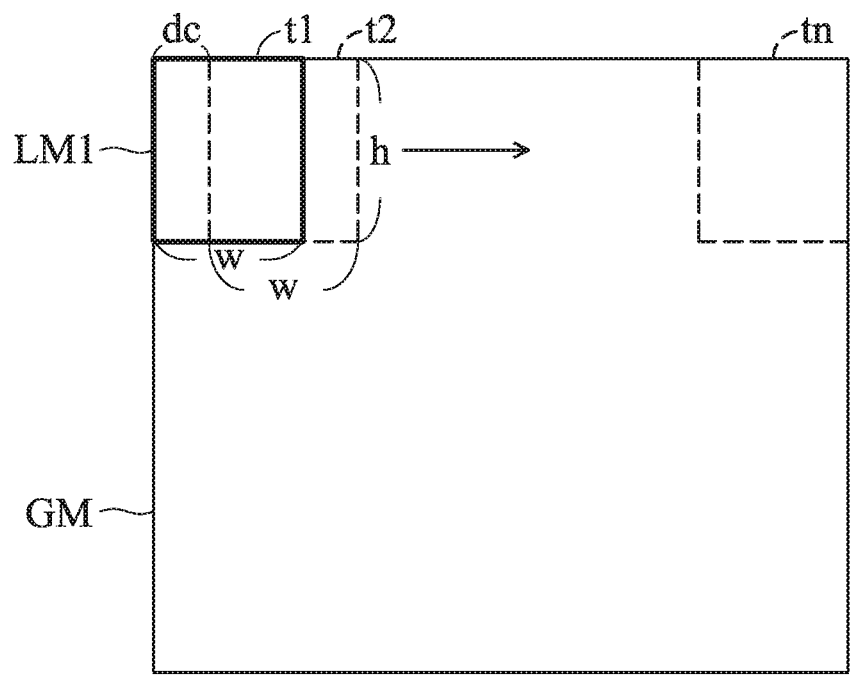
FIGS. 4A-4C are schematic diagrams of an initial local map in accordance with one embodiment of the present disclosure.
Figure 4B:
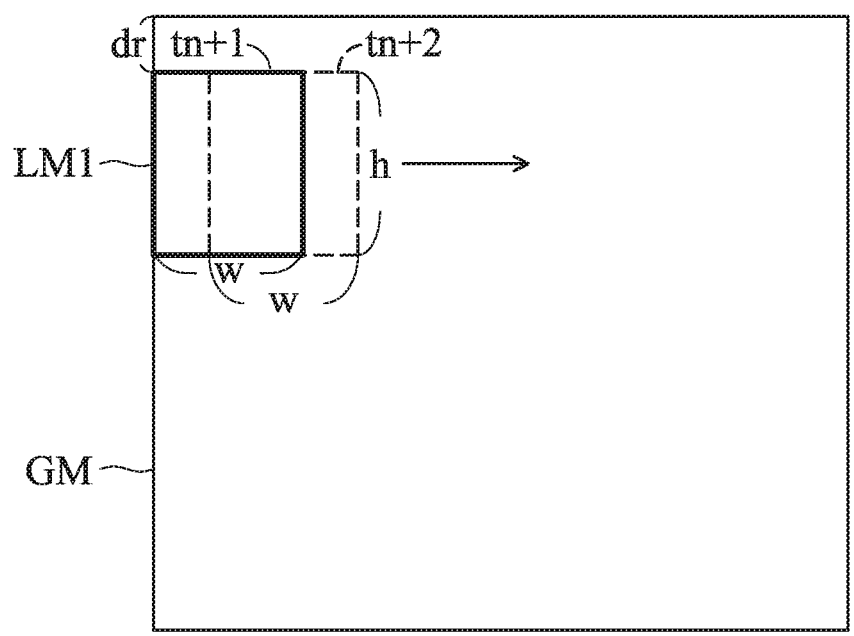
Figure 4C:
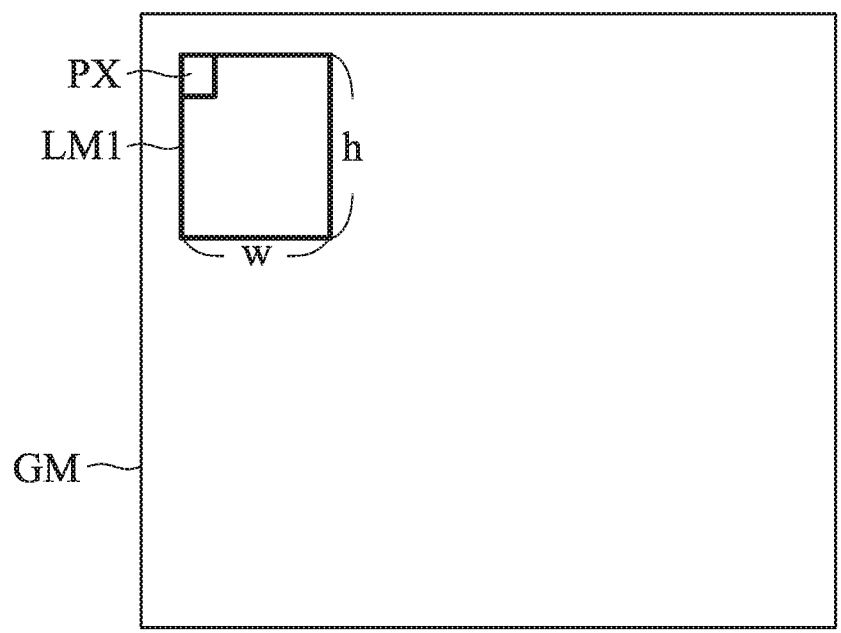

Please refer to FIGS. 4A-4C. FIGS. 4A-4C are schematic diagrams of an initial local map LM1 in accordance with one embodiment of the present disclosure. In one embodiment, the controller 20 compares the initial local map LM1 with a top-left corner starting area t1 of the global map GM. In addition, the controller 20 calculates a similarity weight by a correlation matching method (CCORR). Then, the initial local map LM1 is compared with the area t2 of the global map GM, which is shifted rightwards a specific pixel unit dc (for example, 1 pixel to the right) from the area t1, and another similarity weight is calculated by the correlation matching algorithm. And so on, the controller 20 continues to move the initial local map LM1 toward the right direction of the area t2 by the specific pixel unit, and calculates the similarity weight.

As shown in FIG. 4B, after the controller 20 compares the initial local map LM1 with the global map GM from the top-left corner starting area t1 to the top-right corner area tn, the controller 20 compares the initial local map LM1 with the area tn+1 of the global map GM, which is shifted downwards the specific pixel unit dc (for example, 1 pixel to the right) from the area t1, and calculate another similarity weight. Similarly, after the comparison is made, the area tn+2 of the global map GM, which is shifted rightwards the specific pixel unit, is compared. In other words, the initial local map LM1 is moved from left to right and top to bottom on the global map GM, and the steps are repeated until the controller 20 has compared the initial local map LM1 with all areas of the global map GM. In addition, the controller 20 calculates a corresponding similarity weight to each of comparison. The controller 20 selects the largest similarity weight, and when the largest similarity weight is greater than a weight threshold, the area that corresponds to the largest similarity weight is regarded as one of the similar areas.

In one embodiment, regarding the correlation matching method please refer to FIG. 4C. The initial local map LM1 has a width w and a height h, and the controller 20 sets an initial local map LM1 and an area on the global map GM. When performing the comparison, each pixel in the initial local map LM1 is compared with a pixel in the specific area of the global map GM according to the following function, and a result is calculated (i.e., the range of similarity weight is between 0 and 1):

$$R(x, y) = \sum_{x', y'} (T(x', y') \cdot I(x+x', y+y'))$$

R(x, y) is the specific area result (i.e., similarity weight) of the initial local map LM1 and the global map GM. The larger the value, the more similar the initial local map LM1 is to the specific area on the global map GM. The symbol T(x', y') represents a representative value (which may be a binarization parameter) of a specific position pixel PX in the initial local map LM1. The symbol I(x+x', y+y') represents a representative value (which may be a binarization parameter) of a specific position pixel PX (located in a specific area) on the global map GM. The symbol x' is ranged from 0 to w−1, and y' is ranged from 0 to h−1, thus the similarity weight R(x, y) ranged between 0 and 1 can be calculated. When the initial local map LM1 is shifted to the right by a specific pixel unit, the above function can also be substituted in, to calculate another similarity weight. More specifically, according to the above function, the correlation matching method can calculate the similarity weights of the respective areas of the initial local map LM1 and the global map GM.

After the controller 20 compares the initial local map LM1 with all the areas of the global map GM, the controller 20 selects the largest similarity weight. In addition, when the largest similarity weight is greater than a weight threshold (for example, the weight threshold is 0.85), the area that corresponds to the largest similarity weight is regarded as one of the similar areas. For example, the similarity weight calculated by the initial local map LM1 on the global map GM in FIG. 4C is 0.95, which is greater than the similarity weight calculated by the initial local map LM1 with other positions on the global map GM, and this position (corresponding to similarity weight 0.95) is regarded as a similar area. Therefore, the controller 20 can find out that the most similar area of the global map GM corresponding to initial local map LM1.

In step 220, the controller 20 rotates the initial local map LM1 to generate a rotated local map.

Figure 5A:
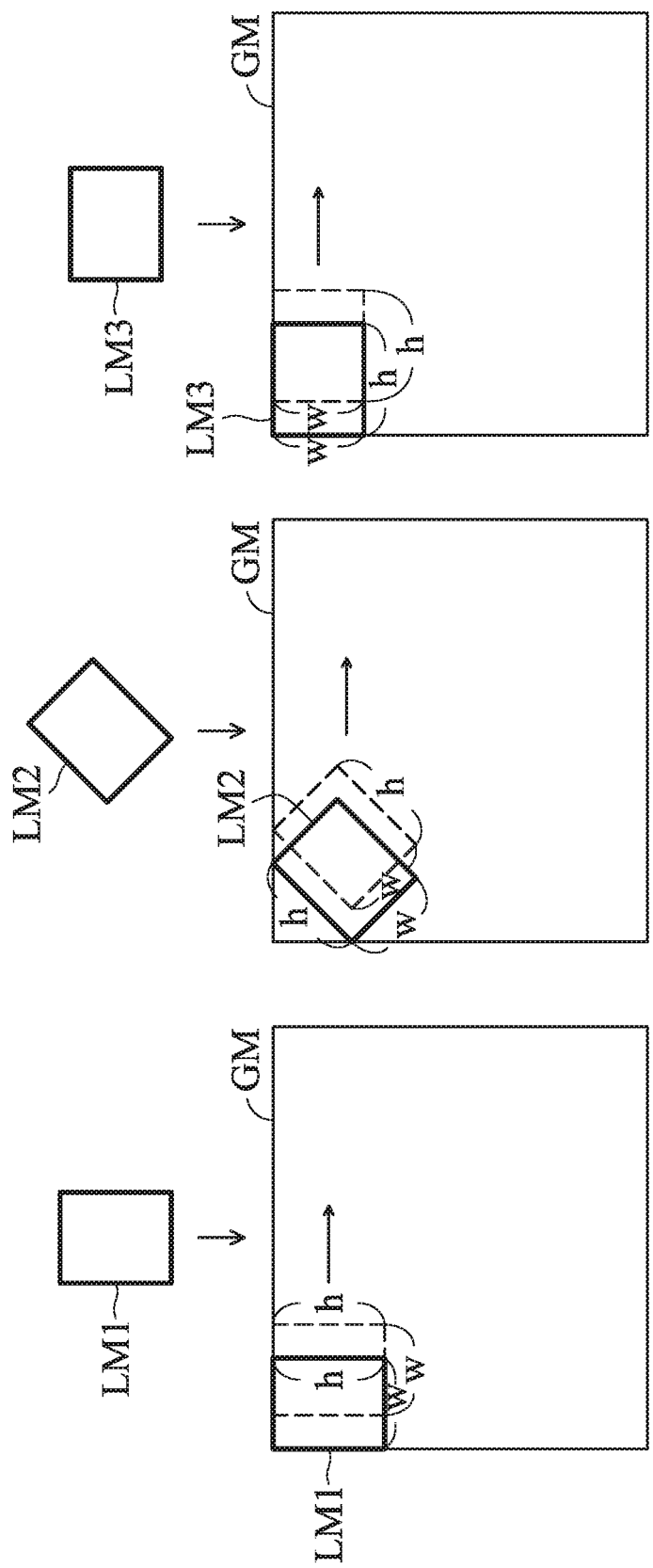
FIG. 5A is a schematic diagram of comparing the rotated local maps and the initial local map with a plurality of partial areas on the global map, respectively, in accordance with one embodiment of the present disclosure.

Refer to FIG. 5A, FIG. 5A is a schematic diagram of comparing the rotated local maps LM2, LM3 and the initial local map LM1 with a plurality of partial areas of the global map GM, respectively, in accordance with one embodiment of the present disclosure. In one embodiment, in order to achieve a more accurate comparison to find out the most similar area of the global map GM corresponding to initial local map LM1. The controller 20 rotates the initial local map LM1 by an angle to generate a rotated local map LM2, and a rotated local map LM3 for rotating another angle. In other words, the rotated local maps LM2, LM3 in FIG. 5A have the same external contour and internal pattern with the initial local map LM1, only different angles. It should be understood by a person skilled in the art that, in order to simplify the drawing, the internal pattern of the rotated local maps LM2, LM3 and the initial local map LM1 is not drawn, and the internal pattern is the same as that of FIG. 3A.

In step 230, the controller 20 compares the rotated local map LM2, LM3 and the initial local map LM1 separately with a plurality of partial areas of the global map GM, so as to obtain at least one similar area.

Due to that the method for comparing the rotated local map LM2 and LM3 with the plurality of partial areas of the global map GM is the same as that for the initial local map LM1 in FIGS. 4A to 4C, and therefore will not be described herein.

In a specific embodiment, the rotation angle may be determined according to actual needs, and 360 degrees would be divided by the rotation angle to generate various rotated local maps. For example, if the rotation angle is set as 60 degrees, it is necessary to generate a plurality of rotated local maps corresponding to 60 degrees, 120 degrees, 180 degrees, 240 degrees, and 300 degrees, respectively. When the rotation angle is set as 120 degrees, it is necessary to generate a plurality of rotated local maps corresponding to 120 degrees and 240 degrees, respectively. The smaller the rotation angle is determined, the more the number of rotated local maps required to be generated, the more accurately the position of the mobile device on the global map GM can be calculated, but consuming more computing resources.

In step 240, the controller 20 calculates at least one candidate coordinates of the mobile device located on the global map according to center point(s) P1-P3 of each of the similar areas.

Figure 5B:
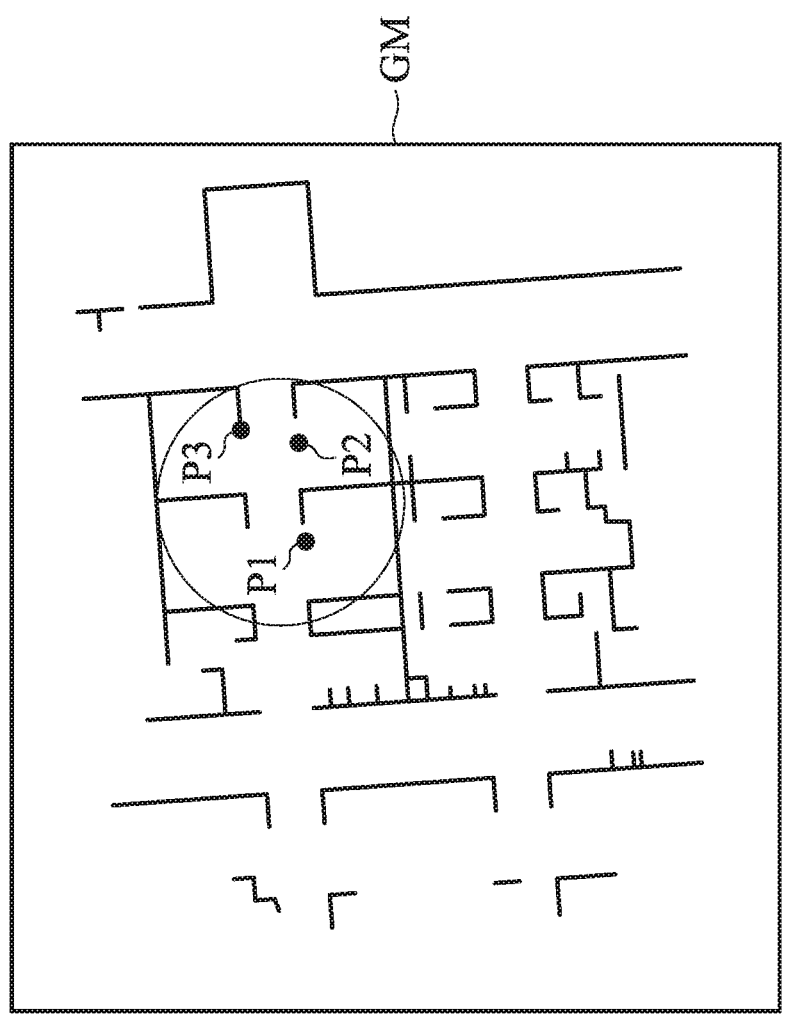
FIG. 5B is a schematic diagram of the center point of each similar area in accordance with one embodiment of the present disclosure.

Refer to FIG. 5B, FIG. 5B is a schematic diagram of the center points P1-P3 of each of the similar areas in accordance with one embodiment of the present disclosure. In one embodiment, it is assumed that the initial local map LM1 corresponds to first similar area of the global map GM, and the center point of first similar area is P1. The rotated local map LM2 corresponds to second similar area of the global map GM, and the center point of second similar area is P2. The rotated local map LM3 corresponds to third similar area of the global map GM, and the center point of third similar area is P3. In addition, the center points P1 to P3 also represent the coordinates of the center points of the global map GM.

Since the center points P1 to P3 are the center points of the similar area, respectively, not the position (i.e. the coordinate on the global map GM) of the lidar 10 (i.e., the mobile device). As such, it is necessary to further calculate the position of the mobile device according to the center points P1 to P3. The method of calculating the candidate coordinates of the mobile device on the global map GM is described below.

Figure 6A:
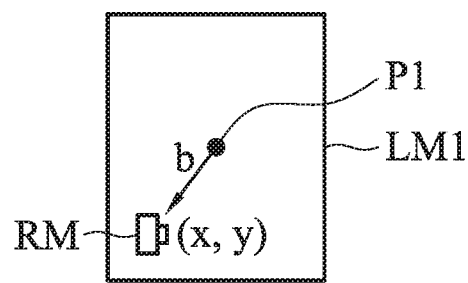
FIG. 6A is a schematic diagram of the candidate coordinates of the mobile device located on the global map calculated according to the initial local map in accordance with one embodiment of the present disclosure.

In one embodiment, please refer to FIG. 6A. FIG. 6A is a schematic diagram of the candidate coordinates RM(x, y) of the mobile device located on the global map GM calculated according to the initial local map LM1 in accordance with one embodiment of the present disclosure. Since the initial local map LM1 is generated by lidar 10, the lidar 10 can know its own position of the initial local map LM1 (i.e. the coordinate of initial local map LM1), that is, the relative position between the lidar 10 and the center point P1 is known (step 230). In detail, the direction and distance b between the lidar 10 and the center point P1 are known information while establishing the initial local map LM1. Therefore, when the center point P1 corresponds to the position or coordinate on the global map GM is obtained, the candidate coordinates RM(x, y) of the mobile device RM including the lidar 10 on the global map GM can be calculated.

Figure 6B:
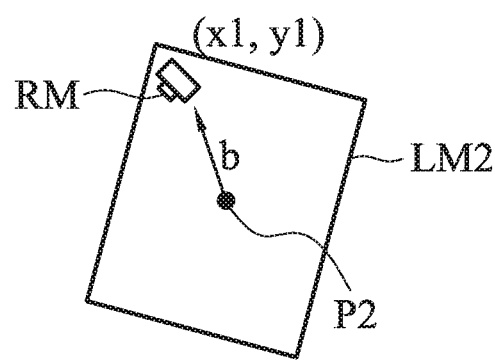
FIGS. 6B-6D are schematic diagrams of the candidate coordinates of the mobile device on the global map calculated by the rotated local map in accordance with one embodiment of the present disclosure.
Figure 6C:
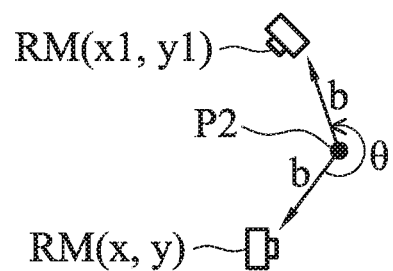
Figure 6D:
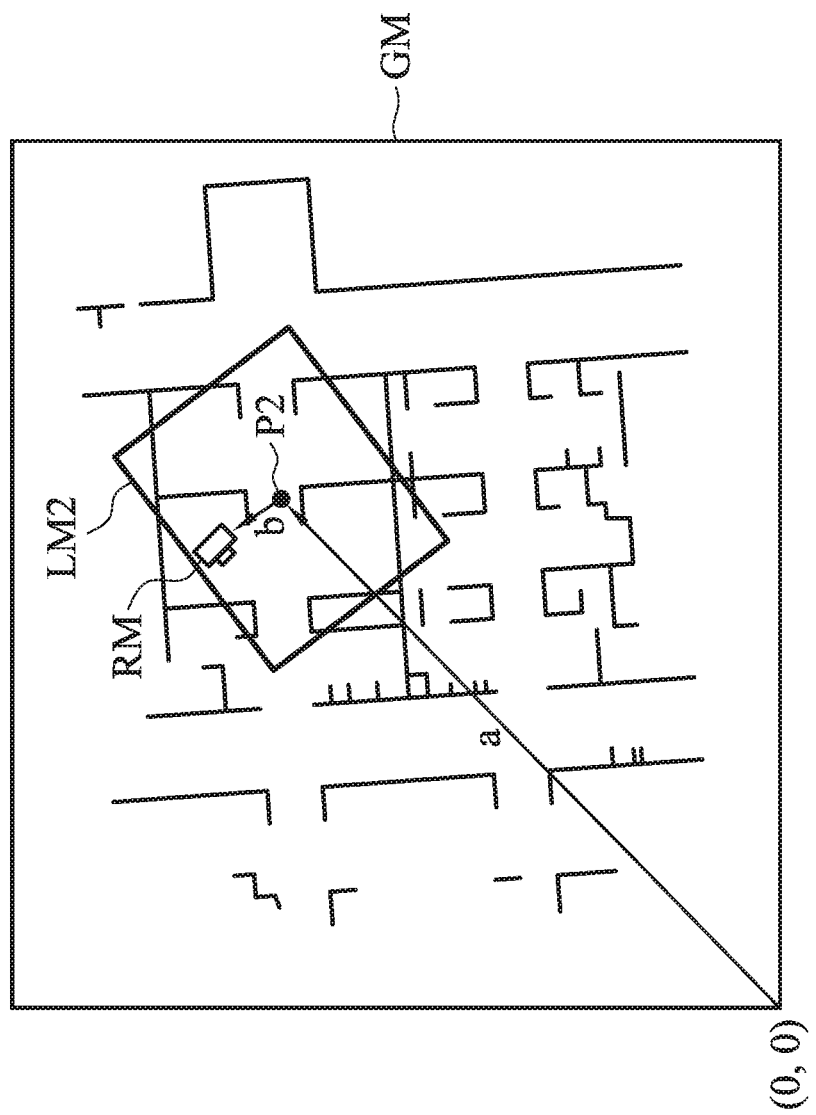

In one embodiment, please refer to FIGS. 6B-6D. FIGS. 6B-6D are schematic diagrams of the candidate coordinates (x1, y1) of the mobile device RM on the global map GM calculated by the rotated local map LM2 in accordance with one embodiment of the present disclosure. Similarly, since the position on the global map GM corresponds to the center point P2 of second similar area, and the rotation angle θ are known, the controller 20 can calculate the candidate coordinates (x1, y1) of the mobile device RM on the global map GM according to the above method and the rotation angle θ.

For example, according to FIG. 6A, the coordinates of the center point P2 and RM(x, y) on the global map GM are known, and the distance b between the lidar 10 and the center point P2 is known, and the rotation angle θ is also known. Therefore, please refer to FIG. 6B, and the candidate coordinates RM(x1, y1) of the global map GM can be calculated according to the following formula:

$$x1 = x \cos \theta - y \sin \theta$$

$$y2 = x \sin \theta + y \cos \theta$$

Therefore, the controller 20 can calculate the candidate coordinates RM(x1, y1) of the mobile device RM on the global map GM according to the center point P2 of second similar area located. In one embodiment, as shown in FIG. 6D, the center point P2, the distance b between the lidar 10 and the center point P2, and the position of the mobile device RM can be plotted on the global map GM. According to the same manner, the candidate coordinates of the mobile device RM corresponding to the center point P3 of third similar area on the global map GM can be calculated. The lower left corner of the global map GM is regarded as the original coordinates (0, 0).

Similarly, the controller 20 can calculate the candidate coordinates (x2, y2) of the mobile device RM on the global map GM in accordance with the above description using the rotated local map LM3.

In step 250, the controller 20 calculates a similarity score for each of the map contours RA, RB, RC corresponding to the global map GM according to the candidate coordinates CRa, CRb, CRc correspond to the map contours RA, RB, RC, respectively.

Figure 7A:
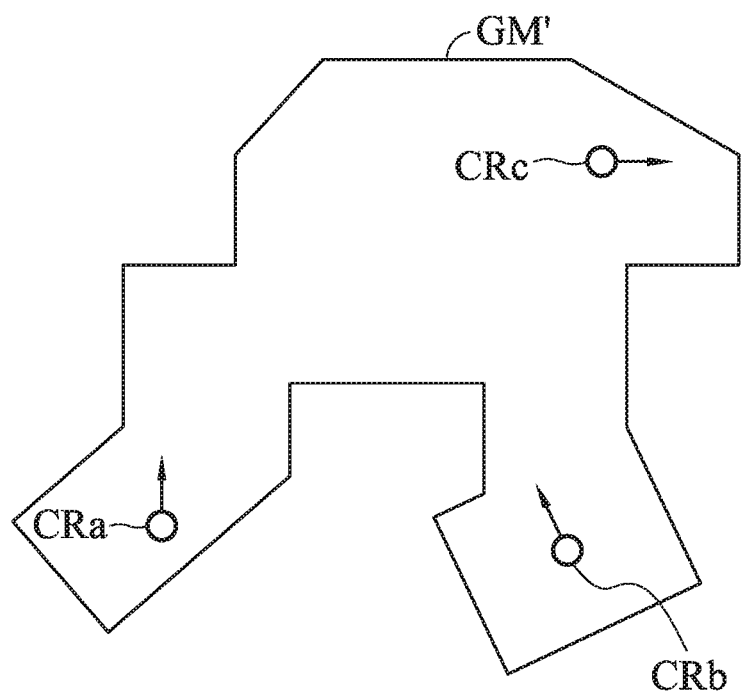
FIG. 7A is a schematic diagram of the candidate coordinates in accordance with one embodiment of the present disclosure.
Figure 7B:
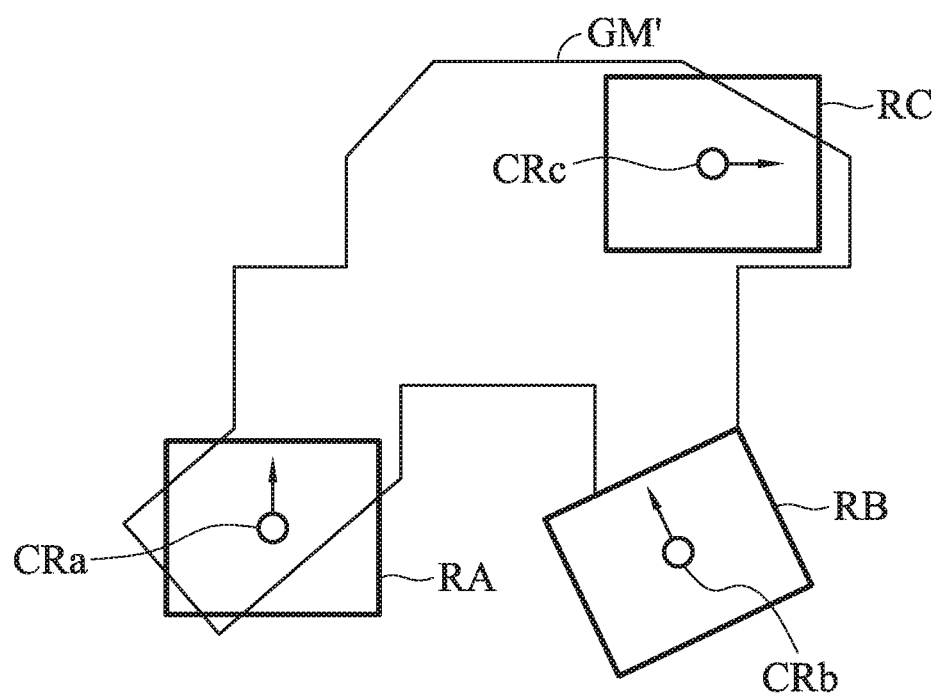
FIG. 7B is a schematic diagram of the map contours corresponding to the candidate coordinates, respectively, in accordance with one embodiment of the present disclosure.

Please refer to FIGS. 7A-7B, FIG. 7A is a schematic diagram of the candidate coordinates CRa, CRb, CRc in accordance with one embodiment of the present disclosure, FIG. 7B is a schematic diagram of the map contours RA, RB, RC corresponding to the candidate coordinates CRa, CRb, CRc, respectively, in accordance with one embodiment of the present disclosure. The candidate coordinates CRa, CRb, and CRc are located on the global map GM'. For convenience of explanation, the global map GM' is used as an example here, and the global map GM' is, for example, an enlarged detail diagram of a part of the global map GM of FIG. 5B, and its coordinates system is the same as the global map GM. The global map GM' shows the possible positions where the mobile device RM may be located, i.e., the candidate coordinates CRa, CRb, CRc, for example, corresponding to the candidate coordinates (x, y), (x1, y1), and (x2, y2) calculated in step 240, respectively.

In this example, as shown in FIG. 7A, after the controller 20 calculates at least one candidate coordinates CRa, CRb, CRc, the controller 20 indicates the candidate coordinates and/or direction on the global map GM'.

In an embodiment, as shown in FIG. 7B, the lidar 10 emits the laser light source and obtains a plurality of laser information. The controller 20 generates at least one map contour RA, RB, and RC according to the laser information. In addition, the controller 20 calculates a number of laser hits corresponding to the map contour RA, RB, and RC respectively on the global map GM' and then obtain the similarity scores for the laser hits corresponding to the map contour RA, RB, and RC' respectively.

For example, the map contour RA has 6 points (the number of laser hits) corresponding to the edge of the global map GM', the map contour RB has 200 points corresponding to the edge of the global map GM', and the map contour RC has 2 points corresponding to the edge of the global map GM'. The similarity score of the map contour RB corresponding to the global map GM' is the highest. It means that the map contour RB has the highest possibility of similarity to the global map GM'.

In step 260, the controller 20 selects the candidate coordinates corresponding to the highest similarity score for use as the coordinates for the mobile device RM on the global map GM.

For example, the controller 20 selects the candidate coordinates corresponding to the map contour RB having the highest similarity score to the global map GM' as coordinate of the mobile device RM on the coordinate system of the global map GM.

The positioning system of the present invention can randomly place the mobile device equipped with the positioning system of the present invention at any position of the known map. When the mobile device is activated at a non-origin or a specific position of the known map, the mobile device can use the laser light source to combine the map information for positioning through the positioning system to achieve fast and accurate positioning effect.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A positioning system, suitable for a mobile device, comprising:
    a storage device, configured to store a global map;
    a lidar, configured to generate an initial local map; and
    a controller, configured to rotate the initial local map to generate a rotated local map, compare the rotated local map and the initial local map separately with a plurality of partial areas of the global map, so as to obtain at least one similar area, calculate at least one candidate coordinates of the mobile device on the global map according to a center point of each of the similar areas, calculate similarity scores according to each of the candidate coordinates, and select the candidate coordinates having highest similarity score as a coordinate for the mobile device on the global map.

2. The positioning system of claim 1, wherein the lidar further comprises:
    an emitter, configured to emit a plurality of laser light sources;
    a receiver, configured to receive at least one reflected light source; and
    an imaging component, configured to generate the initial local map according to the at least one reflected light source and transmit the initial local map to the controller.

3. The positioning system of claim 1, wherein the controller is further configured to rotate the initial local map with different rotation angles to generate a plurality of rotated local maps.

4. The positioning system of claim 3, wherein the rotation angles includes 60 degrees and 120 degrees.

5. The positioning system of claim 3, wherein the controller compares the initial local map with the global map to obtain a plurality of first similarity weights, and the controller compares rotated local map with the global map to obtain a plurality of second similarity weights.

6. The positioning system of claim 5, wherein the controller obtains the plurality of first similarity weights and the plurality of second similarity weights by correlation matching method (CCORR).

7. The positioning system of claim 5, wherein at least one similar area is obtained according to one of the plurality of first similarity weights having largest similarity weight among the plurality of first similarity weights and one of the plurality of second similarity weights having largest similarity weight among the plurality of second similarity weights.

8. The positioning system of claim 1, wherein the controller is further configured to generate at least one map contour and calculate the similarity score for each of the map contours that correspond to the global map.

9. The positioning system of claim 8, wherein the controller calculates a number of laser hits corresponding to the each of the map contours.

10. The positioning system of claim 9, wherein the controller calculates the similarity score according to the number of laser hits.

\* \* \* \* \*